J. L. BANDIERA.
TRANSMISSION GEAR.
APPLICATION FILED MAY 12, 1916.

1,238,623.

Patented Aug. 28, 1917.

Witness
W. A. Williams.

Inventor
J. L. Bandiera.
By
Attorney

UNITED STATES PATENT OFFICE.

JOSEPH L. BANDIERA, OF BOSTON, MASSACHUSETTS.

TRANSMISSION-GEAR.

1,238,623.     Specification of Letters Patent.     Patented Aug. 28, 1917.

Application filed May 12, 1916. Serial No. 97,071.

*To all whom it may concern:*

Be it known that I, JOSEPH L. BANDIERA, of Boston, in the county of Suffolk and State of Massachusetts, have invented certain new and useful Improvements in Transmission-Gears; and I do hereby declare the following to be a full, clear, and exact description of the invention, such as will enable others skilled in the art to which it appertains to make and use the same.

My object is to provide an improved and simple construction comprising but few parts capable of easy operation and not likely to readily become deranged, and to insure quiet operation and prevent stripping of the gears.

Figure 1:
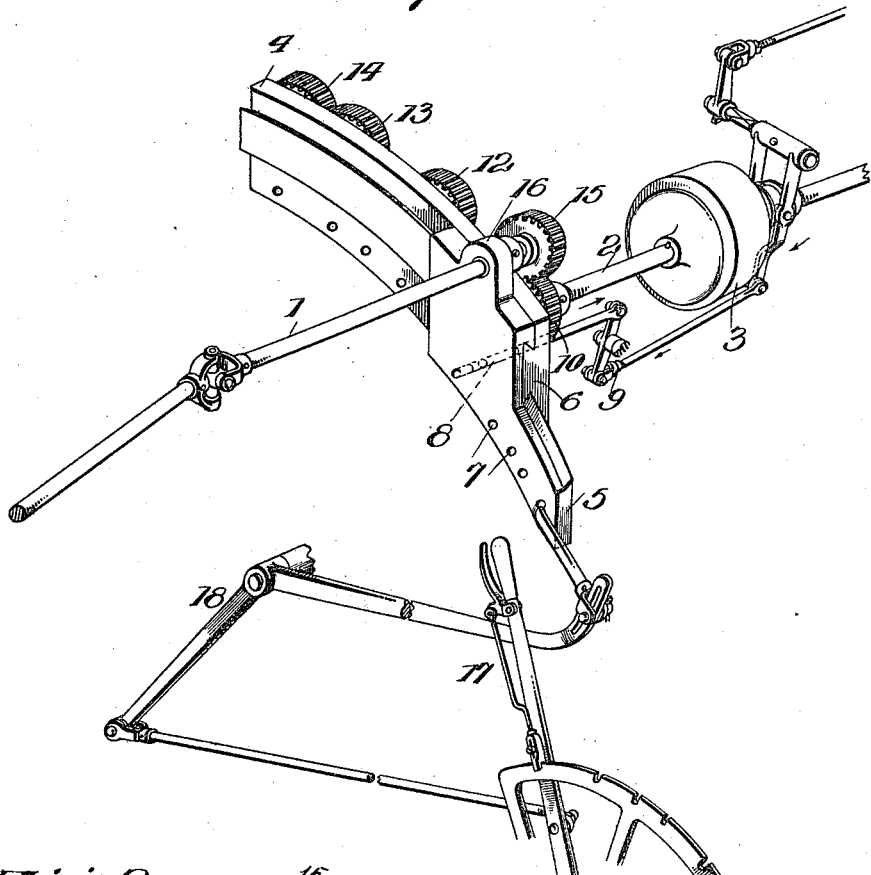
Figure 2:
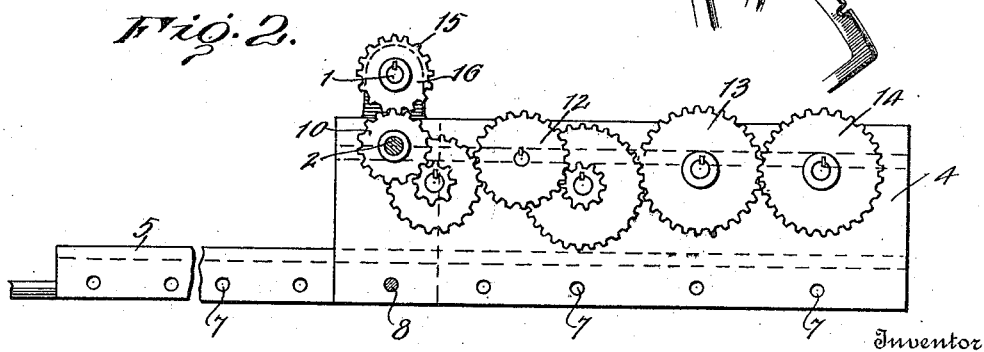

In the drawing Figure 1 is a perspective view illustrating my invention. Fig. 2 is a side elevation.

As shown 1 is the driven shaft and 2 the driving shaft having a clutch 3 which may be constructed and thrown in any known manner.

As appropriate means for mounting the gears, I have shown a block 4 adapted to be mounted at any suitable portion of the frame of the machine and having a plate 5 in sliding engagement therewith so that the plate may move lengthwise of the block to bring the gear of the driven shaft into mesh with the desired operating gear. The block and plate are curved to correspond with the radius of the driven shaft 1. As illustrated a dovetail connection 6 is employed between the block and plate to permit the latter to move easily, and to hold the plates against displacement.

I form the block and the plate with holes 7 through which a locking pin 8 may extend to hold the plate at the desired position. This pin is shown connected by a compensator 9 with the clutch 3 so that when the clutch is out the locking pin will be withdrawn from the holes to permit of the movement of the plate.

All of the driving gears 10, 12, 13, 14 are constantly in mesh. As shown in Fig. 2 the gears 10, 12 and 13 are, by their intermediate pinions, adapted for forward driving while the gear 14 is for the reverse, the gears otherwise varying according to their diameters. The gear 10 is keyed on the driving shaft 2, and gear 15 is keyed on driven shaft 1.

The gear 15 of the driven shaft may be shifted into engagement with any one of the gears 10, 12, 13, 14. I have shown the shaft 1 extending through a bearing 16 mounted on the plate 5 so that as this plate is shifted on the block 4 the gear 15 may be brought to the desired position.

Any appropriate means may be employed for shifting the plate. I have shown a hand lever 17 connected with the plate by a bell crank 18, the hand lever being movable over the quadrant suitably notched to correspond with the various gear connections. The holes 7 are arranged to correspond with these positions of the hand lever so that when the clutch is thrown in the locking pin will pass through registering slots and hold the plate at the desired position to maintain the gear 15 in engagement with any one of the transmission gears.

I claim as my invention:—

1. The combination with a driving shaft having a clutch and a series of intermeshing gears, of a driven shaft having a gear adapted to engage some one of said former gears, and means operated by the throwing in of said clutch for locking said driven shaft gear in an operative position.

2. The combination with a driving shaft having a clutch and a series of intermeshing gears, of a driven shaft having a gear adapted to engage some one of said former gears, means for shifting said driven shaft, and a locking device connecting said shifting means with said clutch.

3. The combination with a driving shaft having a clutch, a rigidly mounted block, a train of intermeshing gears mounted on said block and operated by said shaft, of a driven shaft, a plate forming a bearing for said driven shaft and movable on said block, a gear carried by said driven shaft adapted to mesh with some one of said former gears, and means for locking said plate to said block.

4. The combination with a series of variable gears, a driving shaft for operating said gears and having a clutch, a driven shaft having a gear adapted to mesh with some one of said former gears, means for shifting said driven shaft, and a locking means for said driven shaft rendered operative or ineffective by said clutch.

5. In a power transmission, a driving shaft and a driven shaft, a block having a series of gears thereon operated by said driving shaft, said block having a series of holes, a plate movable on said block and forming a bearing for said driven shaft, a gear on said driven shaft, said plate having a series of holes, a locking pin adapted to be received by registering holes, and means actuated when said driving shaft is rendered operative for inserting said locking pin.

In testimony whereof, I have signed this specification in the presence of two subscribing witnesses.

JOSEPH L. BANDIERA.

Witnesses:
WILMOT R. EVANS, Jr.,
CARL H. GLEASON.